A. L. PUTNAM.
METHOD OF FORMING METAL BLANKS OF VARYING CROSS SECTION.
APPLICATION FILED MAR. 7, 1918.

1,372,246.

Patented Mar. 22, 1921.

Inventor
Alden L. Putnam

By Whittemore Hulbert & Whittemore
Attorneys

UNITED STATES PATENT OFFICE.

ALDEN L. PUTNAM, OF DETROIT, MICHIGAN, ASSIGNOR, BY MESNE ASSIGNMENTS, TO DETROIT PRESSED STEEL COMPANY, OF WILMINGTON, DELAWARE, A CORPORATION OF DELAWARE.

METHOD OF FORMING METAL BLANKS OF VARYING CROSS-SECTION.

1,372,246.  Specification of Letters Patent.  Patented Mar. 22, 1921.

Application filed March 7, 1918. Serial No. 220,918.

*To all whom it may concern:*

Be it known that I, ALDEN L. PUTNAM, a citizen of the United States of America, residing at Detroit, in the county of Wayne and State of Michigan, have invented certain new and useful Improvements in Methods of Forming Metal Blanks of Varying Cross-Section, of which the following is a specification, reference being had therein to the accompanying drawings.

The invention relates to the manufacture of sheet-metal blanks of varying cross-section, being more particularly designed for use in the manufacture of disk wheels but applicable also to other articles. It is the object of the invention to simplify the operation of machining or otherwise removing the metal and also to produce uniformity in results.

In the manufacture of disk wheels the center portion of the blank, or that portion which is secured to the hub, is of greater gage than the peripheral portion which is attached to the rim or felly. The forging of such a blank, particularly where the disk is of relatively light gage metal, is a difficult operation, and consequently blanks are frequently formed by machining from stock of the maximum gage. It is, however, necessary to accurately taper the section, which requires skilful workmanship when performed upon ordinary machine tools. With my improvement the blank to be machined is first conformed to a master so fashioned that a plane cut across the opposite side of the blank will produce the desired variation in gage in all portions thereof. For heavy work the flat blank may be first pressed into approximate form to fit the master, but for the lighter gage work the blank may be conformed merely by clamping pressure.

Figure 1:
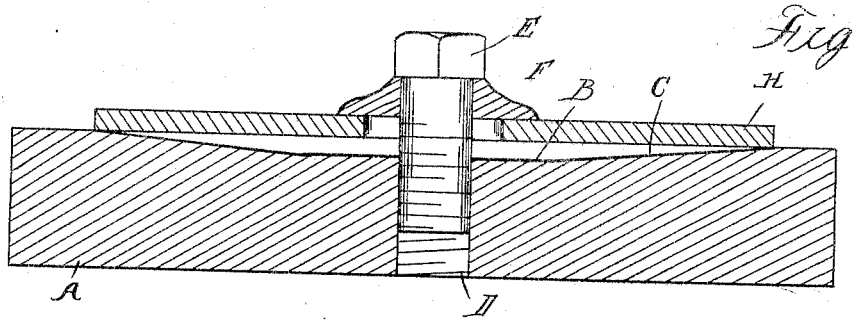
Figure 2:
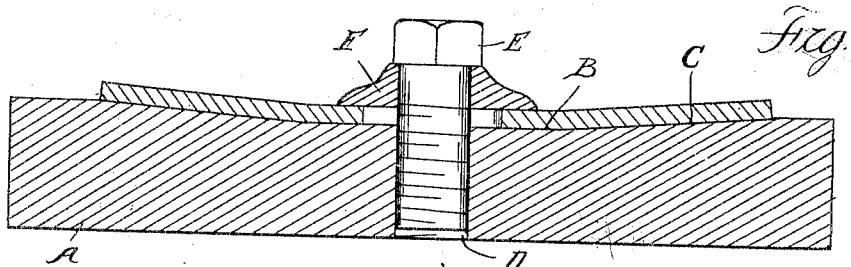
Figure 3:
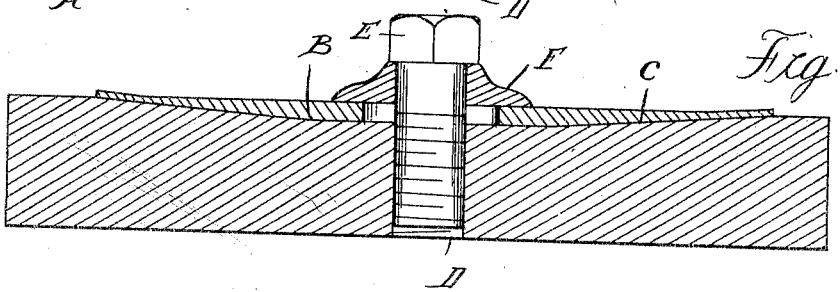
Figure 4:
Figure 5:
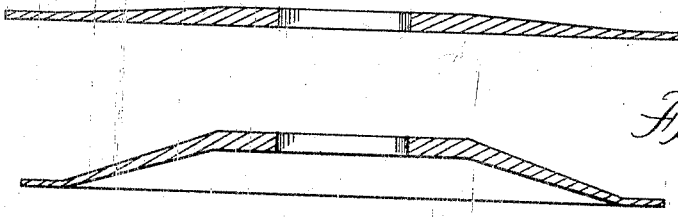

In the drawings I have illustrated my method as applied to the forming of a tapering disk for a vehicle wheel, and Figure 1 is a cross section through the master showing the flat blank to be conformed thereto; Fig. 2 is a similar view after the clamping pressure has been applied; Fig. 3 is a similar view after the cut has been taken to remove the surplus metal; Fig. 4 is a section through the blank removed from the master; and Fig. 5 is a section of the blank pressed to its final form.

A is the master which is a rigid block preferably of cast-metal, the upper face of which has been fashioned to the desired form. As shown the central portion is depressed, as shown at B, and between this central portion and the periphery is a tapering conical portion C. D is a central threaded aperture for engaging a clamping bolt E, and F is a clamping plate engaging the bolt E.

A circular blank of metal, the gage of which is equal to the maximum gage of the finished blank, is then placed upon the master, as indicated at H. The bolt E is then passed through the central aperture in the blank and into engagement with the threaded aperture D and clamping pressure is applied, which will draw the central portion of the blank downward and will at the same time cause all portions of the blank intermediate the center and the periphery to accurately conform to the shape of the master. When clamped, as shown in Fig. 2, a plane cut is taken across the major portion of the exposed surface of the blank, thus as shown in Fig. 3, this cut has been taken on the entire exposed surface excepting only a portion adjacent the periphery which it is not desired to taper, said portion being cut parallel to the conical surface C. Thus when the blank is removed, as shown in Fig. 4, it will have its central portion of full gage, a portion adjacent its periphery of considerably reduced gage and an intermediate portion which will be tapering. On account of the resiliency of the metal and the pressure to which it is subjected in clamping all portions of the lower surface will be brought into close proximity to the abutting face of the master and will be held in firm contact during the machining operation. This would not be the case if the flat blank were merely bolted to a flat table or bed,—first, because the blank is seldom perfectly true; and second, because there is danger that portions not close to the clamping screw may spring away from the bed under the machining operation. Thus my improved method has the advantage of more accurate and uniform results as well as simplifying the operation.

When the blank, after being deflected to a degree not exceeding its elastic limit, is released from the master the resiliency of the metal will cause it to spring back to its original plane, unless it has been conformed to the master by a preliminary die operation. If it is desired to impart to the structure a permanent dished shape this may be performed by a subsequent pressing operation, as indicated in Fig. 5.

In case the above described process is being applied to fashioning blanks from comparatively heavy gage metal, the same apparatus and same steps will be employed, the only difference being that there will be a preliminary step of slightly dishing the disk by the use of suitable dies so as to conform the blank either wholly or in part to the master. The tightening of the bolt E will obviously serve primarily to clamp the die-formed blank to the master, deflecting the same very little, if any. For light gage metal the preliminary die operation is unnecessary.

What I claim as my invention is:

1. The method of forming sheet-metal blanks of varying cross-section, comprising conforming one face of a blank of uniform gage to the fashioned face of a master and taking a plane cut across the exposed face of said blank.

2. The method of forming sheet-metal blanks of varying cross-section, comprising the clamping of the blank to a master having a fashioned face to conform one face of the blank thereto and taking a plane cut across the exposed face of the blank.

3. The method of forming sheet-metal blanks of varying cross-section, comprising the clamping of a uniform gage blank to a master having a fashioned face so as to spring the metal into conformity to said face, and taking a plane cut across the opposite face.

4. The method of forming circular wheel blanks of tapering cross section, comprising the clamping of a blank of uniform cross-section to a master having a fashioned face with a central depression and a portion flaring or tapering therefrom toward the periphery, and taking a plane cut across the opposite face of the blank.

5. The method of forming sheet metal blanks consisting in clamping a sheet metal blank to a non-parallel surface so as to place the metal under tension, and in machining the blank while so tensioned.

In testimony whereof I affix my signature.

ALDEN L. PUTNAM.